United States Patent
Wyss et al.

(10) Patent No.: US 10,275,137 B2
(45) Date of Patent: Apr. 30, 2019

(54) METHOD OF DISPLAYING INCREMENTING OR DECREMENTING NUMBER TO SIMULATE FAST ACCELERATION

(71) Applicant: Trane International Inc., Piscataway, NJ (US)

(72) Inventors: Micah Ray Wyss, Holmen, WI (US); Janelle Jane Jurek, Edina, MN (US)

(73) Assignee: TRANE INTERNATIONAL, Davidson, NC (US)

( * ) Notice: Subject to any disclaimer, the term of this patent is extended or adjusted under 35 U.S.C. 154(b) by 147 days.

(21) Appl. No.: 14/072,412

(22) Filed: Nov. 5, 2013

(65) Prior Publication Data

US 2014/0129970 A1 May 8, 2014

Related U.S. Application Data

(60) Provisional application No. 61/722,450, filed on Nov. 5, 2012.

(51) Int. Cl.
*G06F 3/0484* (2013.01)

(52) U.S. Cl.
CPC .............................. *G06F 3/04847* (2013.01)

(58) Field of Classification Search
None
See application file for complete search history.

(56) References Cited

U.S. PATENT DOCUMENTS

| | | | |
|---|---|---|---|
| 5,202,846 A | 4/1993 | Rasmussen et al. | |
| 5,781,872 A * | 7/1998 | Konishi | B60K 35/00 340/438 |
| 6,937,105 B2 | 8/2005 | Mallinson | |
| 7,080,324 B1 * | 7/2006 | Nelson | G06F 3/04847 715/771 |
| 7,629,966 B2 * | 12/2009 | Anson | G06F 3/0488 178/18.01 |
| 7,725,828 B1 * | 5/2010 | Johnson | 715/726 |
| 9,177,427 B1 * | 11/2015 | Briggs | G07C 5/00 |
| 2004/0267952 A1 * | 12/2004 | He et al. | 709/231 |
| 2008/0066086 A1 * | 3/2008 | Whatmough et al. | 719/322 |
| 2009/0174682 A1 * | 7/2009 | Bowden | B60K 35/00 345/173 |
| 2010/0040349 A1 * | 2/2010 | Landy | 386/96 |
| 2011/0191675 A1 * | 8/2011 | Kauranen | G06F 3/04847 715/702 |
| 2011/0296334 A1 * | 12/2011 | Ryu | G06F 3/0483 715/776 |
| 2012/0089275 A1 * | 4/2012 | Yao-Chang et al. | 701/2 |

(Continued)

OTHER PUBLICATIONS

Benson, "RocketModeler" 2005.*

(Continued)

*Primary Examiner* — Jennifer N To
*Assistant Examiner* — Beau D Spratt
(74) *Attorney, Agent, or Firm* — Hamre, Schumann, Mueller & Larson, P.C.

(57) ABSTRACT

A method for displaying an accelerated change in a numerical value on a computer display, wherein the accelerated change displayed on the computer display is not limited by hardware limitations, such as refresh rate and/or a processor speed. The method displays a sequence of numbers to simulate an accelerating change of the numerical value displayed on a display device.

17 Claims, 4 Drawing Sheets

(56) References Cited

U.S. PATENT DOCUMENTS

| | | | | |
|---|---|---|---|---|
| 2012/0110510 | A1* | 5/2012 | Cindy | G06F 3/0482 715/833 |
| 2013/0132462 | A1* | 5/2013 | Moorer | H04N 21/2343 709/203 |
| 2014/0052746 | A1* | 2/2014 | Kim et al. | 707/758 |
| 2014/0092030 | A1* | 4/2014 | Van der Velden | G06F 3/0488 345/173 |

OTHER PUBLICATIONS

"Interactive Program Downloads", 2010, Benson.*
RocketModeler, 2005, Benson.*
TeamDroid, 2007 John.*
Adamo "Users Guide to MacMECO", 1998.*
Harshad Oak "Building Faster Java", 2005.*
Dejan Jelovic "Why Java Will Always Be Slower than C++", 2001.*
Tesla Model S, 2012, Wordpress https://teslamodelsxc.wordpress.com/2012/09/13/cool-feature-custom-road-signs-for-in dash-nav/ (Year: 2012).*
Car Acceleration TV "Tesla Roadster electric car acceleration [HD]" https://www.youtube.com/watch?v=_DnW3tpQ57I (Year: 2012).*

* cited by examiner

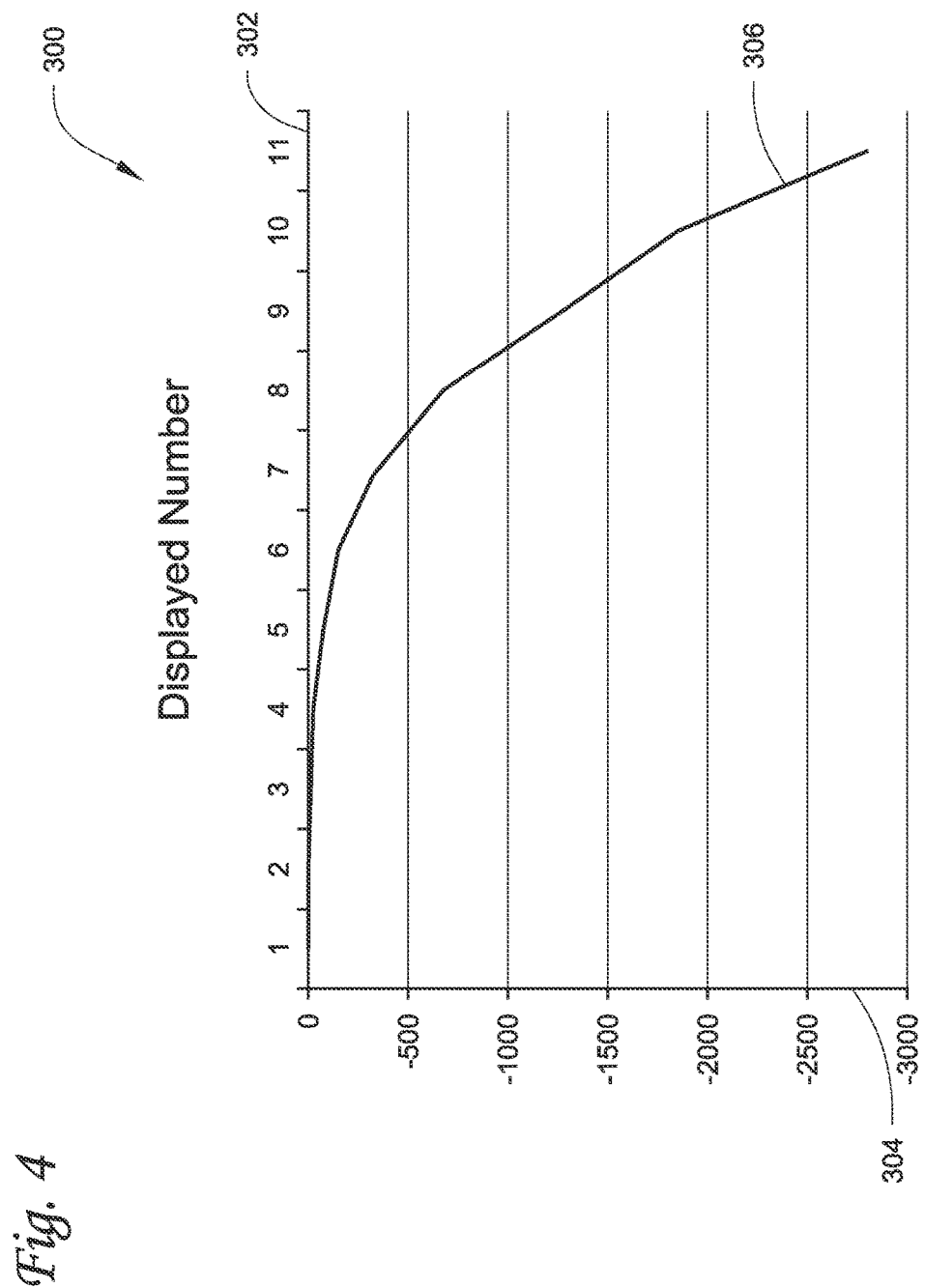

METHOD OF DISPLAYING INCREMENTING OR DECREMENTING NUMBER TO SIMULATE FAST ACCELERATION

FIELD

This disclosure generally relates to a method for displaying an accelerated change in numerical value on a computer display.

BACKGROUND

For a control device, a display device can display a number indicating various conditions that the control device can control, such as a temperature, a pressure, a fan speed, etc.

A user interface of the control device can provide a way to change the number displayed on the display device, to set the number to another number.

When the user interface detects the desired change, the number displayed on the display device is changed.

When the user interface has a simple "increase value" and "decrease value" controls, and when a difference between the desired number and the initial number displayed on the display device is extreme, e.g. the desired number is 123,456,789 and the initial number is 0, it can take some time to change the number to the desired number by interacting with the "increase value" control.

For example, if the control device is configured to change the number value by "1" for each interaction with the "increase value" control. Further, the control device may be configured to display a number for each interaction with the "increase value" control, taking a moment of time to display the number. For example, each moment of time may be 1 second. Thus, for such control device, a user may have to interact with the "increase value" control 123,456,789 times to reach the desired number, taking at least 123,456,789 seconds.

Some control devices may be configured to accelerate the display speed of the number. That is, the moment of time between each number may be shorted from 1 second to half-second, or even less. However, for such control devices, there is a hardware limitation of how quickly the numbers can be displayed on the display device. For example, a screen refresh rate (i.e. refresh speed) of the display device can limit how quickly the numbers can be changed on the display device. Thus, even if the moment of time between each number displayed is shortened, eventually, the hardware limitation limits how quickly the numbers can change on the display device. Other hardware limitations can include, but are not limited to, graphics controller device, processor, user interface, memory, other hardware, other software, and/or combinations of thereof. Accordingly, once the hardware limitation has been reached, the change in the numbers displayed on the display device cannot provide a user to perceive that the change of the number is accelerating.

Further, a control device configured to change the number value by a fixed value for each interaction with the "increase value" and/or "decrease value" controls, the change in the number may not provide a user to perceive that the change of the number is accelerating, in particular when the hardware limitation has been reached.

SUMMARY

The embodiments described herein relate to a method for displaying a sequence of numbers for simulating an accelerating change of a numerical value displayed on a display device without being limited by a hardware limitation. Accordingly, the embodiments provided herein can provide a user to perceive that the change of the number displayed on the display device is accelerating (i.e. the change in the number is speeding up) without being limited by a hardware limitation.

An embodiment of the method includes displaying a first number on the display device, displaying a second number on the display device, and displaying a third number on the display device, wherein a difference of value between the second number and the third number is greater than a difference of value between the first number and the second number.

An embodiment of the method includes displaying a first number on the display device, displaying a second number on the display device, and replacing the first number displayed on the display device.

An embodiment of the method includes displaying a third number on the display device and replacing the second number displayed on the display device.

A difference of value between the second number and the third number is greater than a difference of value between the first number and the second number.

In an embodiment of the method, the difference of value between the first number and the second number is a prime number value.

In an embodiment of the method, the difference of value between the third number and the second number is a prime number value.

In an embodiment of the method, each place digit (i.e., place value or place number) of the first number is different from each place digit of the second number.

In an embodiment of the method, each place digit of the second number is different from each place digit of the third number.

In an embodiment of the method, the second number is greater than the first number. In an embodiment of the method, the third number is greater than the second number.

In an embodiment of the method, the second number is less than the first number. In an embodiment of the method, the third number is less than the second number.

In an embodiment of the method, a user input is detected prior to displaying the first number. In an embodiment of the method, a second user input is detected prior to displaying the second number. In an embodiment of the method, a third user input is detected prior to displaying the third number.

In an embodiment, the method is provided in a computer readable instruction stored in a computer readable memory. In an embodiment of the computer readable memory, the memory includes a computer readable instructions for a method for displaying a sequence of numbers for simulating an accelerating change of a numerical value displayed on a display device without being limited by a hardware limitation, wherein when the computer readable instructions is executed by a processor, a first number is displayed on the display device, then a second number is displayed on the display device, the second number replacing the first number on the display device, and a third number is displayed on the display device, the third number replacing the second number on the display device, wherein a difference of value between the third number and the second number is greater than a difference of value between the second number and the first number.

An embodiment of an electronic device comprises a display, a processor, a memory, and a program, wherein the program is stored in the memory and configured to be executed by the processor, the program including computer readable instructions for one or more of the embodied methods herein. An embodiment of the method includes displaying numbers generally in a same and/or substantially the same portion of the display in order for simulating an accelerating change of the numbers that are displayed on the portion of the display. The same and/or substantially the same portion of the display can be a determined portion of the display. The accelerating change is performed and/or simulated so that the accelerating change is not limited by the display's hardware limitation (e.g., refresh rate). An embodiment of the method comprises displaying a plurality of numbers ($n_i$) in a sequence order (i) on the portion of the display, wherein an absolute differences of values ($|\Delta n_{i,i+1}|=|n_{n+1}-n_i|$) between a displayed number ($n_i$) and another displayed number ($n_{i+i}$) which is displayed after (and replaces) the displayed number ($n_i$) is increased in order to simulate an accelerating change of the displayed numbers, so that the displayed numbers ($n_i$) in the sequential order (i) simulates the accelerating change of the numbers ($n_i$, $n_{i+1}$, $n_{i+2}$, ... ) (either increasing or decreasing) without being limited by hardware capabilities of the display (e.g., refresh rate). For example, the embodiment can display $n_i$, $n_{i+1}$, and $n_{i+2}$ in order in the portion of the display, in sequential order (i). The difference of value between $n_{i+2}$ and $n_{i+1}$ is greater than the difference of value between $n_{i+1}$ and $n_i$. Further, the difference of values can be from a predetermined set of values, such as for example, prime numbers.

Further, the difference of values can be selected so that the displayed numbers do not repeat a particular number for each of the places that are displayed. For example, if "67" is displayed for $n_i$, then $n_{i+1}$ does not display "97" (or another number with 7 in the ones place) because "7" was already displayed in the ones place of $n_i$. This is because when a particular number for the ones place is repeatedly displayed, the sense of acceleration is reduced and/or diminished. In another example, the method can not to display "167" (or another number with "6" in the tens place) for $n_{i+1}$ (or for $n_{i+2}$ if a number with "6" in the tens place is displayed for $n_{i+1}$) because "6" was already displayed in the tens place for $n_i$ because, if the same number in the tens place (or another place number) is repeatedly (or continuously) displayed, the sense of acceleration is reduced and/or diminished.

An embodiment of the method can further include displaying the numbers by increasing the difference of value for each step of the displayed numbers, and not by repeating the difference of value for each of the numbers displayed in sequential order.

BRIEF DESCRIPTION OF THE DRAWINGS

Referring now to the drawings in which like reference numbers represent corresponding parts throughout.

FIG. 4 is a graph showing an accelerated decrease in a number value displayed according to an embodiment.

DETAILED DESCRIPTION

The embodiments described herein are directed to overcome the deficiencies of prior devices and prior methods for displaying a sequence of numbers that are limited by a hardware limitation, such that, once the hardware limitation has been reached, the change in the numbers displayed on the display device cannot accelerate the change in the numbers and/or cannot provide a user to perceive that the change of the number is accelerating.

Changing a number displayed on a display device by a fixed incremental value, such as a value of 1 or 10, etc. does not provide a sense of acceleration. For example, see TABLE 1 and TABLE 2.

TABLE 1 shows ten displays of a sequence of numbers from 100 to 109, each change in value being 1. The sequence of numbers in TABLE 1 has only one place digit changing through the ten display sequences of the numbers.

TABLE 1

| Display Sequence | Displayed Number |
|---|---|
| 1 | 100 |
| 2 | 101 |
| 3 | 102 |
| 4 | 103 |
| 5 | 104 |
| 6 | 105 |
| 7 | 106 |
| 8 | 107 |
| 9 | 108 |
| 10 | 109 |

TABLE 2 shows ten displays of a sequence of numbers from 1000 to 1090, each change in value being 10. The sequence of numbers in TABLE 2 has only one place digit that is changed through the ten display sequences of the numbers.

TABLE 2

| Display Sequence | Displayed Number |
|---|---|
| 1 | 1000 |
| 2 | 1010 |
| 3 | 1020 |
| 4 | 1030 |
| 5 | 1040 |
| 6 | 1050 |
| 7 | 1060 |
| 8 | 1070 |
| 9 | 1080 |
| 10 | 1090 |

Figure 1A:
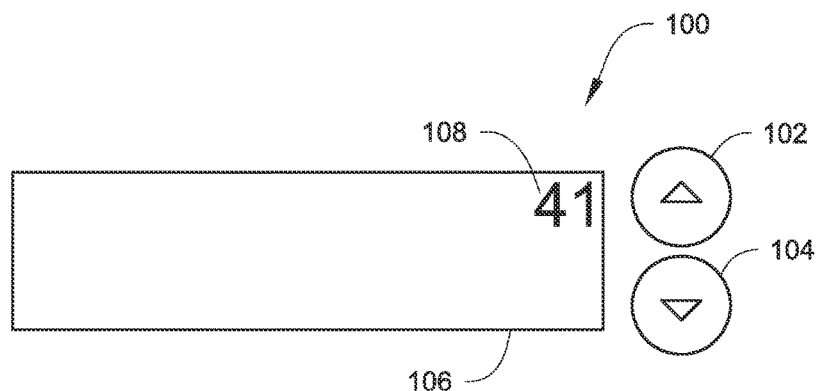
FIGS. 1A, 1B, and 1C are examples of a sequence of numbers displayed according to an embodiment.
Figure 1B:
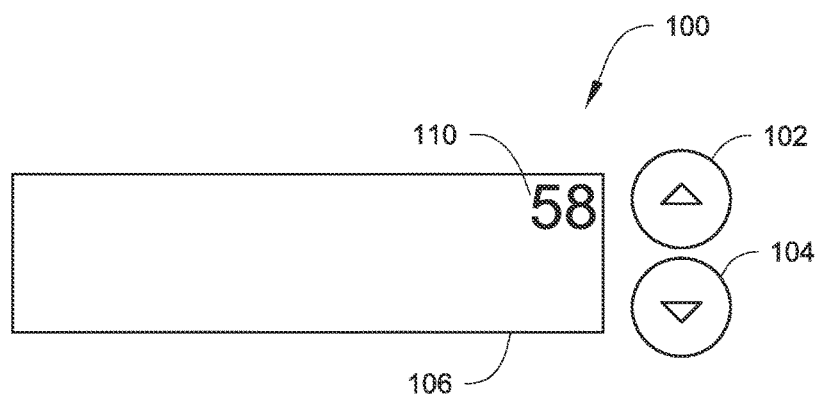
Figure 1C:
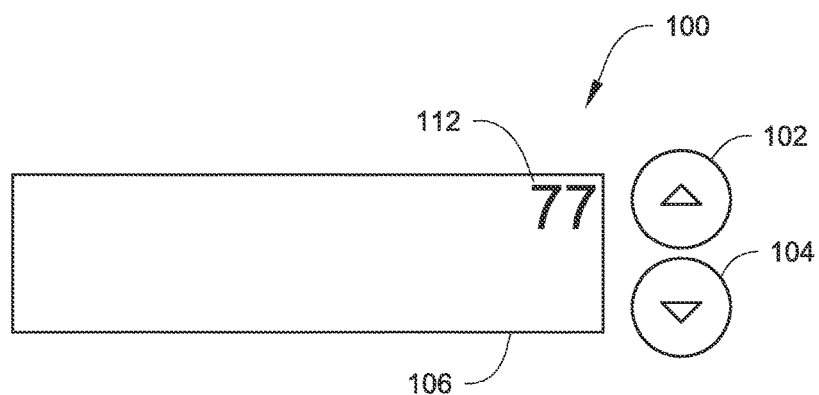

FIGS. 1A, 1B, and 1C show an example of an embodiment of the method provided in a program having one or more computer readable instructions stored in a computer readable memory. The memory includes the program having one or more computer readable instructions for a method for displaying a sequence of numbers for simulating an accelerating change of a numerical value displayed on a display device without being limited by a hardware limitation. When the program and/or the computer readable instructions are executed by a processor, a user interface 100 is displayed on the display device. The user interface 100 includes an "increase value" control 102 and/or a "decrease value" control 104, via which a user input is detected. The user interface 100 includes a number display 106 for displaying a number, such as a first number 108, a second number 110, and a third number 112.

FIG. 1A shows a situation when the user interacts with the "increase value" control 102, the first number 108 can be displayed in the number display 106 of the user interface 100 on the display device.

FIG. 1B shows a situation when the user continues to interact with the "increase value" control 102 or when the user interacts with the "increase value" control 102 a second time, the second number 110 can be displayed in the number display 106 portion of the user interface 100 on the display device. The second number 110 replaces the first number 108 in the number display 106. The second number 110 is greater than the first number 108 because this example is for increasing value via user's interaction with the "increase value" control 102. Had the user interacted with the "decrease value" control 104, the second number 110 would be less than the first number 108.

FIG. 1C shows a situation when the user continues to interact with the "increase value" control 102 or when the user interacts with the "increase value" control 102 a third time, the third number 112 can be displayed in the number display 106 portion of the user interface 100 on the display device. The third number 112 replaces the second number 110 in the number display 106. The third number 112 is greater than the second number 110 because this example is for increasing value via user's interaction with the "increase value" control 102. Had the user interacted with the "decrease value" control 104, the third number 112 would be less than the second number 110.

The difference of value between the first number 108 and the second number 110 is a prime number value of 17. Further, the difference of value between the third number 112 and the second number 110 is a prime number value of 19.

Further, each place digit of the first number 108 is different from each place digit of the second number 110. That is, for the first number 108, the ones place digit is "1" and the tens place digit is "4." For the second number 110, the ones place digit is "8" and the tens place digit is "5." For the third number 112, the ones place digit is "7" and the tens place digit is "7."

The sequence of numbers, from the first number 108 to the second number 110 and then to the third number 112, is according to the numbers shown in Display Sequences 8, 9, and 10, respectively in TABLE 3. TABLE 3 shows an example wherein, in 30 display sequences, the number displayed is changed from 0 to 1556, and each change in value is a prime number value.

Further, the later change in value of the displayed number is greater than the previous change in value (e.g. Display Sequence 1 to 2 has a change in value of 2; Display Sequence 2 to 3 had a change in value of 3; accordingly, the change in value of 3 is greater than the previous change in value of 2).

TABLE 3

| Display Sequence | Displayed Number | Change in value |
| --- | --- | --- |
| 1 | 0 | NA |
| 2 | 2 | 2 |
| 3 | 5 | 3 |
| 4 | 10 | 5 |
| 5 | 17 | 7 |
| 6 | 28 | 11 |
| 7 | 41 | 13 |
| 8 | 58 | 17 |
| 9 | 77 | 19 |
| 10 | 100 | 23 |
| 11 | 129 | 29 |
| 12 | 160 | 31 |
| 13 | 201 | 41 |
| 14 | 244 | 43 |
| 15 | 291 | 47 |

TABLE 3-continued

| Display Sequence | Displayed Number | Change in value |
| --- | --- | --- |
| 16 | 344 | 53 |
| 17 | 403 | 59 |
| 18 | 464 | 61 |
| 19 | 531 | 67 |
| 20 | 602 | 71 |
| 21 | 675 | 73 |
| 22 | 754 | 79 |
| 23 | 837 | 83 |
| 24 | 926 | 89 |
| 25 | 1023 | 97 |
| 26 | 1124 | 101 |
| 27 | 1227 | 103 |
| 28 | 1334 | 107 |
| 29 | 1443 | 109 |
| 30 | 1556 | 113 |

Figure 2A:
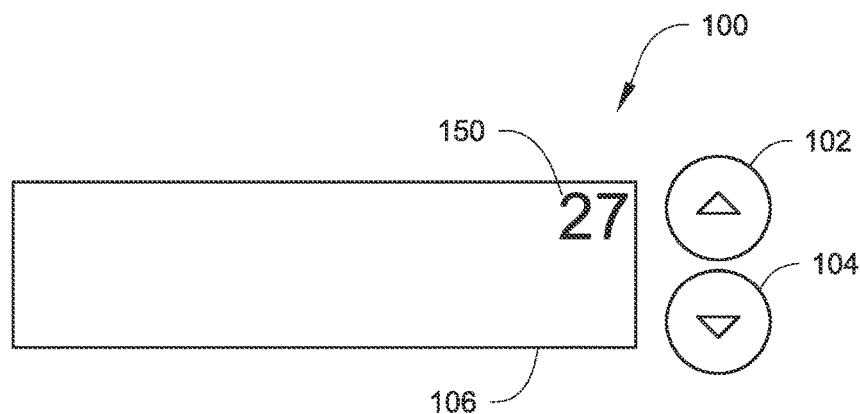
FIGS. 2A, 2B, and 2C are examples of a sequence of numbers displayed according to an embodiment.
Figure 2B:
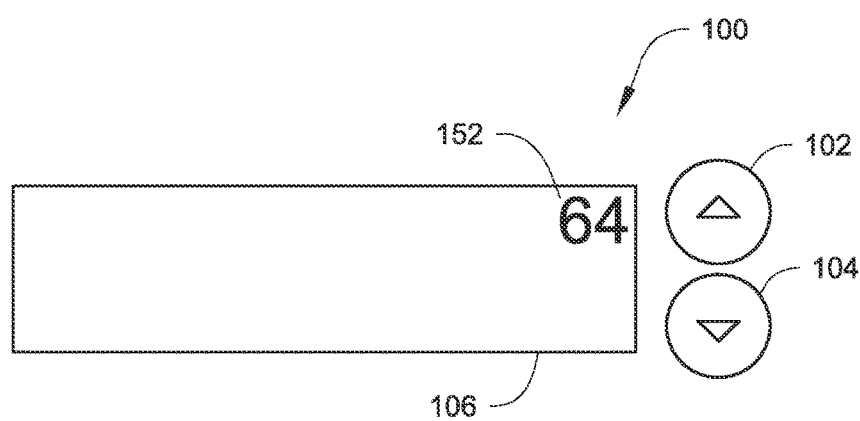
Figure 2C:
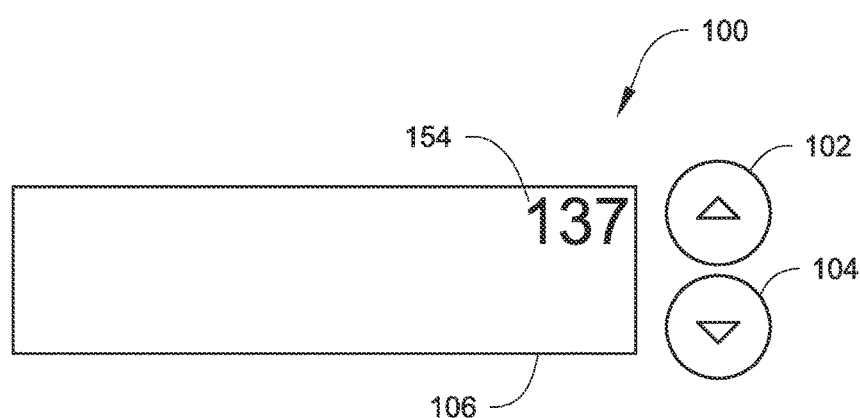

FIGS. 2A, 2B, and 2C show another example of an embodiment of the method is provided in a program having one or more computer readable instructions stored in a computer readable memory. The memory includes the program having one or more computer readable instructions for a method for displaying a sequence of numbers for simulating an accelerating change of a numerical value displayed on a display device without being limited by a hardware limitation. When the program and/or the computer readable instructions are executed by a processor, a user interface 100 is displayed on the display device. The user interface 100 includes an "increase value" control 102 and/or a "decrease value" control 104, via which a user input is detected. The user interface 100 includes a number display 106 for displaying a number, such as a first number 150, a second number 152, and a third number 154.

FIG. 2A shows a situation when the user interacts with the "increase value" control 102, the first number 150 can be displayed in the number display 106 portion of the user interface 100 on the display device.

FIG. 2B shows a situation when the user continues to interact with the "increase value" control 102 or when the user interacts with the "increase value" control 102 a second time, the second number 152 can be displayed in the number display 106 portion of the user interface 100 on the display device. The second number 152 replaces the first number 150 in the number display 106. The second number 152 is greater than the first number 150 because this example is for increasing value via user's interaction with the "increase value" control 102. Had the user interacted with the "decrease value" control 104, the second number 152 would be less than the first number 150.

FIG. 2C shows a situation when the user continues to interact with the "increase value" control 102 or when the user interacts with the "increase value" control 102 a third time, the third number 154 can be displayed in the number display 106 portion of the user interface 100 on the display device. The third number 154 replaces the second number 152 in the number display 106. The third number 154 is greater than the second number 152 because this example is for increasing value via user's interaction with the "increase value" control 102. Had the user interacted with the "decrease value" control 104, the third number 154 would be less than the second number 152.

The difference of value between the first number 150 and the second number 152 is a prime number value of 37. Further, the difference of value between the third number 154 and the second number 152 is a prime number value of 73.

Further, each place digit of the first number 150 is different from each place digit of the second number 152. That is, for the first number 150, the ones place digit is "7" and the tens place digit is "2." For the second number 152, the ones place digit is "4" and the tens place digit is "6." For the third number 154, the ones place digit is "7," the tens place digit is "3," and the hundredths place digit is "1."

The sequence of numbers, from the first number 150 to the second number 152 and then to the third number 154, is according to the numbers shown in Display Sequences 4, 5, and 6, respectively in TABLE 4. TABLE 4 shows an example wherein, in ten display sequences, the number displayed is changed from 0 to 1787, and each change in value is a prime number value.

Further, the later change in value of the displayed number is greater than the previous change in value (e.g. Display Sequence 1 to 2 has a change in value of 3; Display Sequence 2 to 3 had a change in value of 7; accordingly, the change in value of 7 is greater than the previous change in value of 3).

TABLE 4

| Display Sequence | Displayed Number | Change in value |
|---|---|---|
| 1 | 0 | NA |
| 2 | 3 | 3 |
| 3 | 10 | 7 |
| 4 | 27 | 17 |
| 5 | 64 | 37 |
| 6 | 137 | 73 |
| 7 | 310 | 173 |
| 8 | 683 | 373 |
| 9 | 1174 | 491 |
| 10 | 1787 | 613 |

Figure 3:
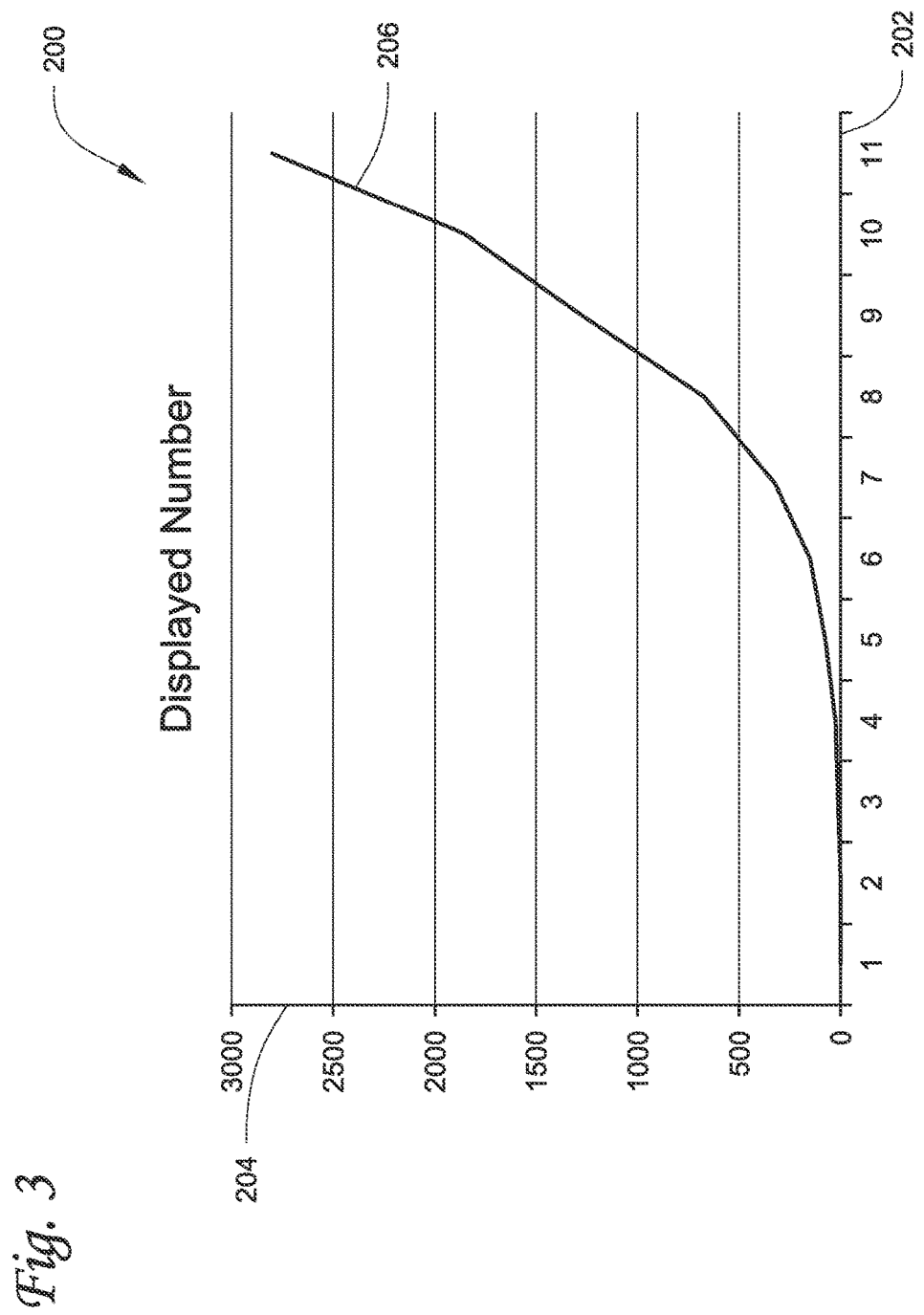
FIG. 3 is a graph showing an accelerated increase in a number value displayed according to an embodiment.

TABLE 4 is shown graphically in FIG. 3. The graph 200 shows the Display Sequences 202 on the X-axis and the Displayed Number 204 on the Y-axis. The curve 206 shows the sequence of numbers according to the Displayed Number column in TABLE 4. The acceleration of the change in value between the Displayed Numbers shown by the curve 206 is not limited by hardware limitations and, as such, even at the hardware limitations, the acceleration of number change can be implemented and displayed on the display device.

Tables 5 and 6 show examples of decreasing number values, such as when the "decrease value" control 104 is interacted with by a user. TABLE 6 is graphically shown in FIG. 4.

TABLE 5

| Display Sequence | Displayed Number | Change in value |
|---|---|---|
| 1 | 0 | NA |
| 2 | −2 | 2 |
| 3 | −5 | 3 |
| 4 | −10 | 5 |
| 5 | −17 | 7 |
| 6 | −28 | 11 |
| 7 | −41 | 13 |
| 8 | −58 | 17 |
| 9 | −77 | 19 |
| 10 | −100 | 23 |

TABLE 6

| Display Sequence | Displayed Number | Change in value |
|---|---|---|
| 1 | 0 | NA |
| 2 | −3 | 3 |
| 3 | −10 | 7 |
| 4 | −27 | 17 |
| 5 | −64 | 37 |
| 6 | −137 | 73 |
| 7 | −310 | 173 |
| 8 | −683 | 373 |
| 9 | −1174 | 491 |
| 10 | −1787 | 613 |

TABLE 6 is shown graphically in FIG. 4. The graph 300 shows the Display Sequences 302 on the X-axis and the Displayed Number 304 on the Y-axis. The curve 306 shows the sequence of numbers according to the Displayed Number column in TABLE 6. The acceleration of the change in value between the Displayed Numbers shown by the curve 306 is not limited by hardware limitations and, as such, even at the hardware limitations, the acceleration of number change can be implemented and displayed on the display device.

TABLE 7 shows an example of incrementing sequence of Displayed Numbers. TABLE 8 shows an example of decrementing sequences of Displayed Numbers. The sequences of Displayed Numbers in TABLES 7 and 8 do not always use prime numbers as Change in value. The sequence of Displayed Numbers in TABLES 7 and 8 do have different place digits between immediately sequential Displayed Numbers.

TABLE 7

| Display Sequence | Displayed Number | Change in value |
|---|---|---|
| 1 | 0 | NA |
| 2 | 3 | 3 |
| 3 | 10 | 7 |
| 4 | 27 | 17 |
| 5 | 60 | 33 |
| 6 | 133 | 73 |
| 7 | 306 | 173 |
| 8 | 679 | 373 |
| 9 | 1452 | 773 |
| 10 | 3225 | 1773 |

TABLE 8

| Display Sequence | Displayed Number | Change in value |
|---|---|---|
| 1 | 0 | NA |
| 2 | −3 | 3 |
| 3 | −10 | 7 |
| 4 | −27 | 17 |
| 5 | −60 | 33 |
| 6 | −133 | 73 |
| 7 | −306 | 173 |
| 8 | −679 | 373 |
| 9 | −1452 | 773 |
| 10 | −3225 | 1773 |

TABLE 9 shows an example of incrementing sequence of Displayed Numbers. TABLE 10 shows an example of decrementing sequences of Displayed Numbers. The sequences of Displayed Numbers in TABLES 9 and 10 include prime numbers as Change in value. The prime numbers are used more than once as Change in value in the sequence. In TABLES 9 and 10, the prime number "3" is used three times as Change in value numbers in sequence, the prime number "7" is used three times as Change in value numbers in sequence, and the prime number "17" is used three times as Change in value numbers in sequence. The resulting sequence of Displayed Numbers in TABLES 9 and 10 have different place digits between immediately sequential Displayed Numbers.

TABLE 9

| Display Sequence | Displayed Number | Change in value |
|---|---|---|
| 1 | 0 | NA |
| 2 | 3 | 3 |
| 3 | 6 | 3 |
| 4 | 9 | 3 |
| 5 | 16 | 7 |
| 6 | 23 | 7 |
| 7 | 30 | 7 |
| 8 | 47 | 17 |
| 9 | 64 | 17 |
| 10 | 81 | 17 |

TABLE 10

| Display Sequence | Displayed Number | Change in value |
|---|---|---|
| 1 | 0 | NA |
| 2 | −3 | 3 |
| 3 | −6 | 3 |
| 4 | −9 | 3 |
| 5 | −16 | 7 |
| 6 | −23 | 7 |
| 7 | −30 | 7 |
| 8 | −47 | 17 |
| 9 | −64 | 17 |
| 10 | −81 | 17 |

TABLES 11 and 12 show examples of sequences of Displayed Numbers having decimal places, wherein the Change in value is function of a prime number value. That is, TABLE 11 has a Change in value that is a function of 0.1×[prime number]. TABLE 12 has a Change in value that is a function of 0.01×[prime number].

TABLE 11

| Display Sequence | Displayed Number | Change in value |
|---|---|---|
| 1 | 0.0 | NA |
| 2 | 0.3 | 0.3 |
| 3 | 1.0 | 0.7 |
| 4 | 2.7 | 1.7 |
| 5 | 6.0 | 3.3 |
| 6 | 13.3 | 7.3 |
| 7 | 30.6 | 17.3 |
| 8 | 67.9 | 37.3 |
| 9 | 145.2 | 77.3 |
| 10 | 322.5 | 177.3 |

TABLE 12

| Display Sequence | Displayed Number | Change in value |
|---|---|---|
| 1 | 0.00 | NA |
| 2 | 0.03 | 0.03 |
| 3 | 0.10 | 0.07 |
| 4 | 0.27 | 0.17 |
| 5 | 0.60 | 0.33 |
| 6 | 1.33 | 0.73 |
| 7 | 3.06 | 1.73 |
| 8 | 6.79 | 3.73 |
| 9 | 14.52 | 7.73 |
| 10 | 32.25 | 17.73 |

TABLE 13 shows an example of a sequence of Displayed Numbers that do not use prime numbers as change in value but still have different place digits between immediately sequential Displayed Numbers.

TABLE 13

| Display Sequence | Displayed Number | Change in value |
|---|---|---|
| 1 | 0 | NA |
| 2 | 2 | 2 |
| 3 | 6 | 4 |
| 4 | 15 | 9 |
| 5 | 36 | 21 |
| 6 | 81 | 45 |
| 7 | 178 | 97 |
| 8 | 383 | 205 |
| 9 | 800 | 417 |
| 10 | 1637 | 837 |

Examples of the above methods can be implemented in computers, controllers, mobile devices, etc. having a user interface for setting a number value for temperature, pressure, fan speed, etc. Other software applications may include the above methods. For example, in software applications that may generate large number of pages, the above method may be implemented for flipping through pages of electronic documents.

With regard to the foregoing description, it is to be understood that changes may be made in detail without departing from the scope of the present invention. It is intended that the specification and depicted embodiment to be considered exemplary only, with a true scope and spirit of the invention being indicated by the broad meaning of the claims.

What is claimed is:

1. A computer implemented method for controlling a condition of a device and displaying of a sequence of numbers representing the condition of the device for performing an accelerating change of a numerical value displayed on a computer display device, wherein the accelerating change of the numerical value representing the condition of the device is displayed on the computer display device without being limited by a refresh rate of the computer display device, the method comprising:
   a processor detecting a user input for incrementing or decrementing a numerical value representing the condition of the device displayed on a portion of the computer display device, wherein the user input is detected prior to displaying a first number on the portion of the computer display device,
   after detecting the user input, the processor performing the accelerating change of the numerical value for changing the condition of the device displayed on the portion of the computer display device, the accelerating change comprising:
   displaying a plurality of numbers ($n_i$) in a sequence order (i) on the portion of the display, wherein an absolute differences of values ($|\Delta n_{i,i+1}|=|n_{i+1}-n_i|$) is increased for each of the sequence order (i), and ones place digit of the plurality of numbers displayed at the portion of the display is not sequentially repeated, by displaying on the portion of the computer display device, the first number in the sequence of numbers; displaying on the portion of the computer display device, a second number in the sequence of numbers replacing the first number displayed on the portion of the display device; and displaying on the portion of the computer display device, a third number in the sequence of numbers replacing the second number displayed on the portion of the display device, wherein a difference of value between the first number and the second number is a prime number value, a difference of value between the third number and the second number is a prime number value, and each place digit of the first number is different from each place digit of the second number, wherein the accelerating change performed by the processor provides the numerical value displayed in the computer display device to be an up-to-date value according to the processor that is not limited by the refresh rate of the computer display device; and the processor controlling the device to have the condition set to the numerical value displayed on the computer display device.

2. The computer implemented method according to claim 1, further comprising detecting a second user input for incrementing or decrementing the numerical value displayed on the portion of the computer display device according to the sequence of numbers, wherein the second user input is detected prior to displaying the second number on the portion of the computer display device.

3. The computer implemented method according to claim 2, further comprising detecting a third user input for incrementing or decrementing the numerical value displayed on the portion of the computer display device according to the sequence of numbers, wherein the third user input is detected prior to displaying the third number on the portion of the computer display device.

4. The method according to claim 1, wherein the condition is a fan speed.

5. The method according to claim 1, wherein the condition is a temperature.

6. The method according to claim 1, wherein the condition is a pressure.

7. A computer readable memory, comprising:

computer readable instructions, on a non-transitory computer readable memory, for a method to control a condition of a device and to control displaying of a sequence of numbers to perform an accelerating change of a numerical value representing the condition of the device displayed on a display device, wherein when the computer readable instructions is executed by a processor, the processor receives a user input to increment or decrement the numerical value representing the condition of the device displayed on the display device, wherein the processor performs the accelerating change of the numerical value so that the numerical value displayed on the display device is an up-to-date value according to the processor that is not limited by the refresh rate of the display device;

after the processor receives the user input, a first number in the sequence of numbers is displayed on the display device;

a second number in the sequence of numbers is displayed on the display device, the second number replacing the first number on the display device; and a third number in the sequence of numbers is displayed on the display device, the third number replacing the second number on the display device, wherein a difference of value between the first number and the second number is a prime number value, a difference of value between the third number and the second number is a prime number value, and each place digit of the first number is different from each place digit of the second number, wherein displaying the sequence of numbers at the portion of the display to perform the accelerating change of incrementing or decrementing numbers includes displaying a plurality of numbers ($n_i$) in a sequence order (i) on the portion of the display, wherein an absolute differences of values ($|\Delta n_{i,i+1}|=|n_{i+1}-n_i|$) is increased for each of the sequence order (i), and ones place digit of the plurality of numbers displayed at the portion of the display is not sequentially repeated; and the processor controlling the device to have the condition set to the value displayed on the display device.

8. The computer readable memory according to claim 7, wherein the condition is a fan speed.

9. The computer readable memory according to claim 7, wherein the condition is a temperature.

10. The computer readable memory according to claim 7, wherein the condition is a pressure.

11. An electronic device, comprising:
a display;
a processor connected to the display;
a memory in communication with the processor; and
a program stored in the memory and configured to be executed by the processor, the program including one or more computer readable instructions for:

the processor receiving a user input to increment or decrement a number representing a condition of a second device, the number being displayed at a portion of the display;

after the processor receives the user input, the processor displaying a plurality of numbers at the portion of the display to perform an accelerating change of incrementing or decrementing numbers by displaying a plurality of numbers ($n_i$) in a sequence order (i) on the portion of the display, wherein an absolute differences of values ($|\Delta n_{i,i+1}|=|n_{i+1}-n_i|$) is increased for each of the sequence order (i), wherein the absolute differences of values ($|\Delta n_{i,i+1}|=|n_{i+1}-n_i|$) is a prime number value, and ones place digit of the plurality of numbers displayed at the portion of the display is not sequentially repeated, so that the plurality of numbers displayed on the portion of the display performs an accelerating change, wherein the accelerating change performed by the processor provides the numerical value displayed in the display to be an up-to-date value according to the processor that is not limited by a refresh rate of the display; and the processor controlling the second device to have the condition set to the number displayed on the display.

12. The electronic device according to claim 11, wherein i of the sequence order (i) is at least 10.

13. The electronic device according to claim 11, wherein i of the sequence order (i) is at least is at least 20.

14. The electronic device according to claim 11, wherein i of the sequence order (i) is at least is at least 30.

15. The electronic device according to claim 11, wherein the condition is a fan speed.

16. The electronic device according to claim 11, wherein the condition is a temperature.

17. The electronic device according to claim 11, wherein the condition is a pressure.

* * * * *